UNITED STATES PATENT OFFICE.

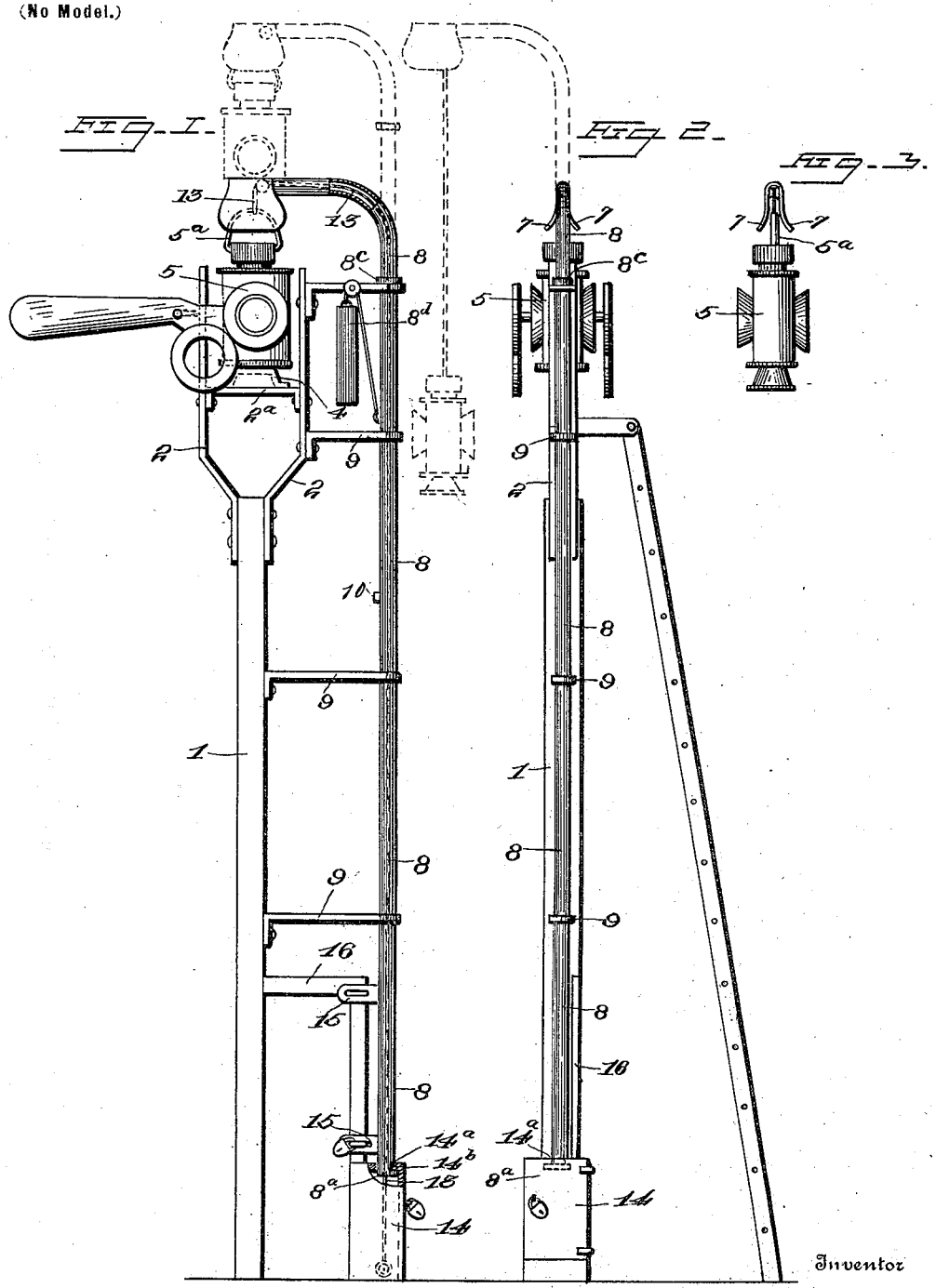

ABRAHAM C. JOHNSON, OF WINONA, MINNESOTA.

SEMAPHORE.

SPECIFICATION forming part of Letters Patent No. 703,932, dated July 1, 1902.

Application filed February 25, 1902. Serial No. 95,608. (No model.)

*To all whom it may concern:*

Be it known that I, ABRAHAM C. JOHNSON, a citizen of the United States, and a resident of Winona, in the county of Winona and State of Minnesota, have made a certain new and useful Invention in Semaphores; and I declare the following to be a full, clear, and exact description of the same, such as will enable others skilled in the art to which it appertains to make and use the invention, reference being had to the accompanying drawings, and to figures of reference marked thereon, which form a part of this specification.

Figure 1 is a side elevation of my invention as applied, the signal-lantern being shown as raised in dotted lines. Fig. 2 is a rear view of the same, the lantern being shown as turned to one side and partly lowered in dotted lines. Fig. 3 is a detail front view of the lantern and wings 7 7.

This invention relates to semaphores for railroads, having for its object the provision of means for raising and lowering the signal light or lantern to and from its place by the operator from the ground below and without the necessity for climbing the semaphore-ladder, as is now the case.

With this object in view the invention consists in the novel construction and combination of parts, all as hereinafter described, and pointed out in the appended claims.

Referring to the accompanying drawings, the numeral 1 designates the supporting-frame of the semaphore, having the usual ladder attachment carrying the support 2 for the lantern, having cross-bar $2^a$ upon which the lantern rests, such cross-bar being formed with a central projection or lug 4, seating in a socket at the base of the lantern to hold such firmly in place.

5 is the lantern, having handle or bail $5^a$, having attached thereto the rope or cable 13, which passes over an antifriction-roller of tube 8 down and through such tube and into the lock-box 14, immovably fixed near the ground below and preferably formed of iron or steel. This tube 8 is supported vertically parallel to the semaphore-frame and has a vertical and rotary movement in the guide-brackets 9 9 of such frame, the lower end portion of the tube being arranged when lowered to be received in an opening $14^a$ in the top of the box 14, the hinged door of such box having a lug $14^b$ at the top which fits when closed over a lip or flange $8^a$ of the tube and prevents it from being raised until released by the opening of such door, for which a suitable lock is provided. The tube is bent at right angles at its upper end over the lantern and carries at its upper extremity the pair of depending and diverging guide flanges or wings 7, normally partly inclosing the bail or handle of the lantern. The tube is normally supported by collar $8^c$, resting upon uppermost guide-bracket 9, and is counterbalanced at $8^d$.

The method of operation is as follows: The lantern being in proper raised position and it being desired to lower the same the box 14 is unlocked by the operator and the tube 8 raised to the height shown by dotted lines in Fig. 1 of the drawings and turned one-fourth way around to the front, as shown in dotted lines in Fig. 2, the lantern remaining in place and the rope or cable slipping through the tube, as may be required, the tube being held in raised position by lug 10, resting upon bracket 9, through an opening of which it has previously passed. The lantern is now lowered to the ground by its rope connection, such being of sufficient length to still leave the end thereof in the box 14, and is lighted, extinguished, or otherwise attended to, after which it is again raised by the cord to its former position at the top of tube 8, which tube is turned with the lantern one-fourth around to the rear and is then lowered with the lantern until such lantern occupies its proper position on the rest 4. The wings 7 are of such form as to act upon the bail of the lantern to cause it to assume its proper signal position no matter in what position the bail may be at the time it strikes such wings. The door of the box 14 is now closed and locked, securing the tube in lowered position against being tampered with, the rope connection of the lantern being inside the box and protected by the tube 8.

16 is a guide-frame attached to main frame 1 and having a staple or similar device at the top arranged to engage the slot in the lug 15 of the tube 8, and to which it may be locked, if desired.

A combination of guide-wires may be used in lieu of the devices hereinbefore described to accomplish the same results, as fully described and illustrated in my caveat filed in November, 1901.

Having thus described my invention, what I claim as new, and desire to secure by Letters Patent, is—

1. In a semaphore, means for first raising the signal-lantern vertically from its pole or support, such means being adapted to be turned to one side in a horizontal plane to clear the lantern from its support, to lower the lantern to the ground below, to raise it again, to return it over its support, and to lower it thereupon, substantially as specified.

2. In a semaphore, the signal-lantern, the rope or cable connected thereto, the slidable and rotatable guide and protecting-tube for such rope, and means for locking such tube in lowered position, substantially as specified.

3. In a semaphore, the signal-lantern, the rope or cable connected thereto, the slidable and rotatable guide and protecting-tube for said rope and having the guide wings or flanges, means for counterbalancing said tube, and means for locking such tube in lowered position, substantially as specified.

4. In a semaphore, the signal-lantern, the rope or cable connected thereto, the slidable and rotatable guide and protecting-tube for said rope, and having the guide wings or flanges, a lock-box at the base of such tube, and arranged to receive the lower end thereof, and of the rope or cable, a door for said box arranged to engage said tube when closed to secure the same in lowered position, and means for counterbalancing such tube, substantially as specified.

In testimony whereof I affix my signature in presence of two witnesses.

ABRAHAM C. JOHNSON.

Witnesses:
C. G. MAYBURY,
D. E. TAWNEY.